United States Patent Office 2,788,257
Patented Apr. 9, 1957

2,788,257

CRYSTALLIZATION PROCESS FOR RECOVERING SYLVITE FROM SYLVINITE ORE

James B. Duke, Lakeland, Fla., assignor to Minerals & Chemicals Corporation of America, Menlo Park, N. J., a corporation of Maryland No Drawing. Application November 19, 1954, Serial No. 470,119

8 Claims. (Cl. 23—31)

This invention relates to the recovery of sylvite from sylvinite ore by processes involving solution and subsequent crystallization.

Sylvinite is a mechanical mixture of sylvite (KCl) and halite (NaCl) which occurs in natural deposits in various places throughout the world. Sylvinite ore almost always has some insoluble material of a clayey nature, which disperses to a finely divided form in water or brine, intimately associated with the soluble chlorides. Hereinafter this insoluble material will be referred to as slime, although the term slime is sometimes applied to all finely divided material in an ore pulp, including the fines of the valuable constituent or constituents. The presence of slime is obviously detrimental to the separation of crystals from brine and consequently only relatively low slime ores are presently being used in the aforesaid solution and crystallization method of KCl recovery from sylvinite. The slime content of sylvinite ores varies from relatively low concentrations such as, for example, 0.5 to 1 percent by weight up to concentrations as high as 4 percent or sometimes even higher.

Briefly, the process in commercial use at the present time, for recovering sylvite from sylvinite by solution and crystallization, comprises:

1. Crushing the ore from the mine to a suitable size such as minus-4-mesh or minus-10-mesh.
2. Dissolving the sylvite from the crushed ore in hot brine, unsaturated with respect to sylvite, in such proportion that the final brine is substantially saturated with respect to sylvite.
3. Delivering the hot slurry to a filter or other type of separating device for removal of slime and undissolved halite, which materials are sent to waste.
4. Cooling the clear brine from step 3 and thus precipitating KCl crystals which are the final product.

The cooled brine from step 4, from which the sylvite crystals have been removed, is usually referred to as mother liquor. Mother liquor, with the addition of make-up water or brine, if necessary, is normally heated to unsaturation with respect to KCl and recirculated to the process for the solution of KCl from new feed ore. Therefore, the term brine, as used in step 2 above and throughout this specification, is usually taken to mean mother liquor. However, unless qualified it is not to be limited to this meaning but should be considered broad enough to include aqueous solutions of any of the soluble constituents of sylvinite ore, regardless of strength, and even pure water.

The success of solution and crystallization methods on sylvinite is due to the fact that sylvite becomes more soluble in water saturated with halite, with increasing temperature, whereas the direction of greater solubility of halite in water saturated with sylvite is just the reverse. Consequently, a hot brine saturated with respect to both halite and sylvite will, upon cooling, deposit pure crystals of sylvite and end up as a solution saturated with respect to sylvite but capable of dissolving more sodium chloride. The cooled brine upon reheating becomes unsaturated with sylvite and therefore useful for leaching KCl from sylvinite, as mentioned above.

As hereinbefore stated, the above-described process is commercially successful only on low slime (0.5 to 1.0 percent) ores. The results shown in the examples to follow readily demonstrate the fact that high slime content in an ore is detrimental to the thickening of saturated brines made from it in that inordinately large thickener volumes are required and much brine is lost in the underflows therefrom.

The principal object of my invention is to provide an improved process of treating sylvinite ore to recover sylvite by solution and crystallization such as to make the treatment of high slime ores practicable.

The essence of the aforesaid improved process which is my invention resides in a simple heat treatment of sylvinite ore and particularly high slime sylvinite ore prior to the conventional solution and crystallization processing of said ore. I have discovered that heating high slime sylvinite ore to about 950° F. and then allowing it to cool effects a change in the character of the slime which shows up in greatly improved settling and filtration properties. I have also discovered that heating high slime sylvinite ore to a temperature of about 750° F. and holding it there for at least 15 minutes has about the same effect on the slime, insofar as improvement of settling and filtration properties are concerned, as heating to about 950° F. without retention thereat. I have further discovered that heating a high slime sylvinite ore to the comparatively low temperature range of from about 220° to about 240° F. and maintaining it there for as long as two hours does not improve the settling characteristics of its slime, but on the contrary, has a deleterious effect on them. I have found that combinations of heating temperatures and times other than those mentioned improve slime settling and filtration properties to varying degrees and I, therefore, do not wish to be limited to the two preferred embodiments of my invention set forth above. Any heat treatment of sylvinite ore between the temperature limits of about 500° F. and the fusion temperature of the ore is to be considered within the scope of my invention, these limits being based on experimental observations.

Preferably, I heat the ore to a temperature within the range of from about 750° F. to about 950° F. prior to the solution step, with best results being obtained when the ore is maintained within such temperature range for a period of from about ten minutes to about two hours.

Although I do not wish to theorize as to the nature of the changes wrought in sylvinite ore slimes by the heat treatments of my invention, the fact that such changes are effected is evidenced by:

1. Less dispersion of the heated slime in brine than is the case with unheated slime which results in a coarser suspension of the former than of the latter.
2. The fact that the settling rate of slime from brines of heat treated ore is greatly increased by the addition of a small amount of flocculant to the brine, whereas a flocculant has very little, if any, effect on slime from unheated ore.
3. Compaction of the heated slime to a denser pulp in the compression zones of settling and, with the addition of a flocculant, in less time than is the case with unheated slime.
4. Faster filtration with removal of more brine from the cakes with slurries of heated slime than with slurries of unheated slime.
5. Faster settling of slimes in brines of heat treated ores than of unheated ore.

As one skilled in the art will realize from the above, heating high slime sylvinite ores according to the teachings of my invention gives them many advantages over the unheated ores insofar as subsequent solution and crystallization for recovery of sylvite is concerned. The heated ores require considerably less thickener volume than the unheated ones; less brine accompanies the waste thickener underflow with heated ores than with unheated ones and the underflows of the heated ores can be economically filtered for brine recovery whereas underflows from unheated ores cannot. However, I wish to have it clearly understood that my invention is not restricted to processes employing a thickener operation or using only high slime ores. My improvement could, for instance, be utilized with advantage on ore of any slime content or in a process in which the entire feed slurry is filtered, after solution of the KCl, with no thickener being employed at all.

The thickener area required for any combination of feed and underflow dilutions can be evaluated using the following formula:

$$A = \frac{1.333 \ (F-D)}{R \ (sp. \ gr.)}$$

Where—

$A$ = Area in sq. ft. per ton of dry feed solids per 24 hr. (ft.$^2$/24 hr. ton)
$F$ = Dilution (liquid/solid ratio by wt.) of feed to thickener
$D$ = Dilution of thickener underflow
$R$ = Settling rate of thickener feed
Sp. gr. = Specific gravity of liquor in which settling takes place (about 1.25 for the brines referred to herein)

This equation clearly indicates the importance of settling rate in establishing thickened area. The settling rate referred to here is the rate of subsidence of the mass of solids in a slurry of F dilution. This type of settling is known as phase subsidence and it is characterized by a sharp line of demarcation between settled slurry and its supernatant liquid which line descends at a fairly constant rate. If phase subsidence is allowed to continue long enough a solids concentration is reached at which the settling rate decreases markedly and this is called the point of compression. Thereafter the settled slurry undergoes thickening at a gradually decreasing rate to an ultimate density and is considered to be in the zone of compression.

Also important in the design of thickeners is the capacity in the compression zone. The depth may be calculated for a thickener of given area if values for the following are known:

1. Hours required for the pulp to reach its discharge dilution from the time it enters the compression zone.
2. The average specific gravity of the solids in the compression zone.
3. The average specific gravity of the pulp in the compression zone.
4. The specific gravity of the liquor in which the settling takes place.

The depth will vary directly as the thickening time (1) and inversely as the pulp average specific gravity (3). The improvement which I am disclosing as my invention (heating), plus the addition of a trace of flocculant, effects faster thickening and greater average pulp density in the compression zone (as well as greater ultimate density) than is attainable with ores which have not been heated and thus assures economical thickener volumes for high slime sylvinite ores.

The following examples are given to illustrate the successful practicing of my invention but are not to be construed as limiting the invention to any set of conditions set forth therein.

EXAMPLE I

This example will show the settling properties of slime from sylvinite ore which has had no heat treatment.

In this example minus-10-mesh high slime (containing 3.8% insoluble material) sylvinite ore from the Carlsbad potash district of New Mexico was mixed with tap water and the slurry heated to 220° F. at which temperature it was maintained until all of the KCl had dissolved and then cooled to room temperature. The final slurry of undissolved crystals (largely halite) and insoluble material in saturated brine was poured through a 200-mesh screen to remove the plus-200-mesh particles.

A 250 ml. graduate was filled with the slime slurry and the depth of clear supernatant liquid noted at time intervals as the solids settled. The solids content of the slurry added to the graduate was determined to be 9.33%. The settling data are below:

Table 1

| Time from Start of Test, Minutes | Depth of Supernatant Liquid, Inches |
| --- | --- |
| 10 | ⅛ |
| 20 | ½ |
| 30 | ¾ |
| 40 | 1 |
| 50 | 1³⁄₁₆ |
| 60 | 1¼ |
| 120 | 1⅞ |

The solids content of the slurry in the zone of compression after two hours of settling was only 9.83%.

From the above table, the settling rate during phase subsidence can be easily determined from the boundary movement between the 20 minute interval and the 40 minute one. This rate amounted to 0.125 foot per hour. The table also reveals that phase subsidence took place until some time between 40 and 50 minutes after the start of the test at which time the point of compression was reached.

The slow thickening rate in the zone of compression coupled with the comparatively low average pulp density therein makes it obvious that a thickener for the slurry of this example would have to be inordinately deep to have enough capacity. In addition, there would be a considerable brine loss in the underflow due to its relatively low solids content. Primarily for these reasons, the cost of treating high slime sylvinite ore by solution and crystallization, in the conventional manner, would be prohibitive.

EXAMPLE II

This example will show the settling properties of slime from the same sylvinite ore as that of Example I, which has been heated for two hours at low temperatures (within the ranges of 220° F. to 240° F.).

In this example a sample of the same minus-10-mesh ore as that of Example I was heated for two hours within the temperature range of 220° to 240° F. and then subjected to the same solution and settling treatment as that given the unheated ore in Example I.

The slurry added to the graduate for determination of its settling rate contained 5.74% solids. Settling data are tabulated below:

Table 2

| Time from Start of Test, Minutes | Depth of Supernatant Liquid, Inches |
| --- | --- |
| 10 | ¹⁄₁₆ |
| 20 | ⅛ |
| 30 | ⅛ |
| 40 | ⅛ |
| 50 | ³⁄₁₆ |
| 60 | ³⁄₁₆ |

After 60 minutes of standing the solids were redispersed in the brine, 1 part of organic flocculant to 9,920 parts of solids was mixed into the slurry and further settling data were taken. The flocculant used was S-3000, a product of American Cyanamid Company. The subsidence boundary (the boundary between settled slurry and supernatant liquid) had descended 1 inch at the end of the first 10 minutes and thereafter moved too slowly for measurement.

The final solids content (by final is meant, at the time of the last subsidence reading) of the settled slurry was 5.81% without the flocculant and 6.38% with the flocculant.

The settling data from this example show that, in the case of the slurry without the flocculant, the rate of subsidence was extremely slow, so slow in fact that it seems probable the point of compression had, in effect, already been passed at the start of the settling test and consequently the material was merely thickening instead of settling. With respect to the effect of the flocculant on the settling characteristics of the slurry, it is obvious that, although it quickly produced an ultimate density, this ultimate density represents too dilute a thickener underflow for practical purposes.

This example demonstrates that heating a high slime sylvinite ore for two hours at temperatures within the range of 220° to 240° F. does not render the ore amenable to treatment by solution and crystallization for sylvite recovery, even when followed by the use of a flocculant.

Comparison of the results in this example with those in Example I shows that heating sylvinite ore to the low temperature range of from 220° F. to 240° F. produces no improvement in slime settling properties but, in fact, has a deleterious effect on them.

EXAMPLE III

This example is the control test of a series of tests included to show the improvement in settling and filtration properties of slime from sylvinite ore as a result of heat treating the said ore within the temperature range of from about 750° F. to about 950° F. inclusive. In this example, the sylvinite ore had no previous heat treatment.

One thousand grams of high slime sylvinite ore from the same source as that used for Examples I and II was mixed with 1,000 ml. of water and the mixture then heated to boiling with stirring. The hot slurry was allowed to cool to about 140° F. and then poured through a 65-mesh screen to remove large crystals. The slurry of minus-65-mesh particles in brine was poured into a 1,000 ml. graduate and the average rate of subsidence of the solids for the first half hour determined. In addition the solids content of the settled slurry in the graduate after 3½ hours of standing was evaluated. The latter slurry was considered to be close to its ultimate density. Test data, including the solids content of the slurry initially (as added to the graduate) are given below.

Table 3

Initial solids in slurry=10.1%
Solids in settled slurry (3½ hrs.)=13.7%
Average subsidence (first ½ hr.)=0.23 ft./hr.

Taking the data of Table 3 (in which the average subsidence rate of 0.23 ft./hr. is assumed to be the value for R in the area equation, and 13.7%, the solids content in the underflow) the thickener area required for the slurry of this example can be calculated, by means of the said area equation, to be 12 ft.²/24 hr. ton. If the slurry of this example were thickened to produce a clear overflow and an underflow of 13.7% solids, the brine recovery in the overflow would amount to only 29.5% of that in the thickener feed.

The contents of the graduate were agitated to complete dispersion of the solids, with the addition of the flocculant Galactosol in the amount of 1 part to 100,000 parts of slurry. Galactosol is a mannogalactan gum product of General Mills, Inc. The slurry was allowed to settle for three hours, at which point the rate of thickening had slowed appreciably and the test was discontinued. Data comparative to those in Table 3 were evaluated, and appear below.

Table 4

Solids in settled slurry (3 hrs.)=15.0%
Average subsidence (first ½ hr.)=0.33 ft./hr.

Comparison of the results in Table 4 with those in Table 3 shows that the use of a flocculant with brine slurries from unheated high slime sylvinite ores accomplishes little improvement in subsidence rate or underflow dilution during subsequent thickening of the said slurries. If a commercial thickener produced a clear overflow and a 15.0% solids underflow from a slurry equivalent to that of the present example, the brine recovery in the overflow would amount to 36.4% of that fed to the unit.

To illustrate the difficulty of filtering a slime underflow slurry from unheated sylvinite ore, such as the 15.0% solids one of this example, the supernatant liquid was siphoned from the graduate containing the 15.0% solids sludge and the sludge then subjected to vacuum filtration during which the vacuum was measured to be 24 inches of mercury. It took 36 minutes to complete the filtration after which the cake was found to contain 26.1% moisture.

EXAMPLE IV

This example is comparative to Example III for the purpose of illustrating the improvement in settling and filtration properties of slime from sylvinite ore brought about by heating the said ore to a temperature of 950° F. The only differences between this example and Example III were as follows:

1. The feed ore was heated to a temperature of 950° F. and immediately allowed to cool prior to slurrying it in water.

2. The settling of the slurry to which the flocculant had been added proceeded so rapidly that subsidence observations were recorded at 5 minute intervals and the test was discontinued after 25 minutes.

3. The original slurry, as added to the graduate, contained 8.28% solids.

Pertinent test data are in Table 5, below.

Table 5

WITHOUT FLOCCULANT

Solids in settled slurry (3½ hrs.)=38.9%
Average subsidence (first ½ hr.)=1.19 ft./hr.
Thickener area=8.52 ft.²/24 hr. ton
Brine recovery in overflow=85.7%

WITH FLOCCULANT

Solids in settled slurry (25 min.)=28.2%
Average subsidence (first 5 min.)=6.75 ft./hr.
Thickener area=1.35 ft.²/24 hr. ton
Brine recovery in overflow=77.0%

FILTRATION

Vacuum=20 in. Hg
Time=15 sec.
Cake moisture=24.1%

The principal advantages of my disclosed invention are strikingly illustrated by a comparison of the results of this example with those of Example III. For example:

1. The "heated" slurry (Example IV) without flocculant settled more than five times as fast as the "unheated" one (Example III); when a trace of flocculant was added to the former, its subsidence rate increased to more than 29 times that of the latter. This sharp increase in subsidence rate manifests itself in a greatly reduced thickener area for the slurry from the heated ore (1.35 ft.²/24 hr. ton for the heated ore with flocculant vs. 12 ft.²/24 hr. ton for the slurry from unheated ore).

2. The slurry from the heated ore thickened to a greater pulp density and at a faster thickening rate, especially with the addition of a flocculant, than that from the unheated ore (28.2% solids in 25 minutes for the former vs. 15.0% solids in three hours for the latter—with flocculant being used in both cases). Thus, the thickener required for the slurry from a heated ore would need much less depth than that from the same ore unheated and there would be considerably less brine loss in the underflow from the former than in that from the latter (witness the 85.7% brine recovery in the overflow of Example IV vs. the 29.5% recovery in its counterpart overflow of Example III).

3. The thickened slurry from the heated ore filtered in 1/145 of the time required to filter the thickened slurry from the unheated ore and the cake contained slightly less moisture in the former case. Obviously heating the ore makes a filtration of underflow feasible where otherwise such an operation would be out of the question. In a commercial operation embodying the conditions of Example IV, the brine recovery in thickener overflow and filtrate from the underflow would amount to approximately 97%.

Thus, it has been amply demonstrated that heating a high slime sylvinite ore to 950° F. without retention thereat, prior to recovery of its sylvite by solution and crystallization, is a useful embodiment of my invention.

EXAMPLE V

This example is comparative to Examples III and IV for the purpose of illustrating the improvement in settling and filtration properties of slime from sylvinite ore brought about by heating the said ore to a temperature of 750° F. and holding it at that temperature for 15 minutes. It differs from Examples III and IV only in the following respects:

1. The feed ore was heated to a temperature of 750° F. and held there for 15 minutes before being cooled and slurried in water for partial solution of its soluble constituents.
2. The slurry with the flocculant was observed every five minutes, as in Example IV, but for a total time lapse of 40 minutes.
3. The slurry as added to the graduate contained 7.8% solids.

Pertinent test data are below, in Table 6.

Table 6

WITHOUT FLOCCULANT

Solids in settled slurry (3½ hrs.)=45.3%
Average subsidence (first ½ hr.)=0.92 ft./hr.
Thickener area=12.2 ft.$^2$/24 hr. ton
Brine recovery in overflow=89.8%

WITH FLOCCULANT

Solids in settled slurry (40 min.)=32.0%
Average subsidence (first 5 min.)=8.0 ft./hr.
Thickener area=1.29 ft.$^2$/24 hr. ton
Brine recovery in overflow=82.1%

FILTRATION

Vacuum=18 in. Hg
Time=18 sec.
Cake moisture=24.3%

The above results, in comparison with those of Example III, prove that heating a high slime sylvinite ore to 750° F., with retention thereat for 15 minutes, alters the slime in the ore to the extent that during subsequent solution and crystallization of said ore for recovery of its sylvite:

1. The thickener area required (when a trace of flocculant is employed) is greatly reduced from that needed for the unheated ore.
2. The thickener volume required is greatly reduced from that needed for the unheated ore.
3. The filtration rate of the thickened solids is much faster than that of the solids from unheated ore.

Comparison of the results of this example with those of Example IV will reveal that heating a sylvinite ore for 15 minutes at 750° F. improves subsequent settling and filtration of its slime to about the same extent as does simply heating the ore to 950° F. and then allowing it to cool.

The term flocculant, as used herein, refers to any material, organic or inorganic, which hastens the settling of potash slimes but my preferred class of materials in this category comprises the well-known organic reagent used in the flotation of sylvite from sylvinite as auxiliary agents, such as starches, dextrins, cellulosic materials, lignin, vegetable gums, mannogalactans, proteinaceous colloids, etc.

I claim:

1. In a process for the recovery of sylvite from sylvinite ore composed substantially of sylvite, halite, and water insoluble slime comprising dissolving sylvite from the ore with hot brine, unsaturated with respect to sylvite, to form a hot aqueous solution of soluble constituents of the ore in which solution is suspended slime and undissolved halite, mechanically separating the suspended slime and undissolved halite from said hot aqueous solution, and then cooling the aqueous solution thereby causing sylvite to crystallize; the improvement comprising heating the sylvinite ore to a temperature of from about 500° F. to the fusion temperature of the ore prior to the solution step.

2. The process of claim 1 in which the sylvinite ore is heated to a temperature within the range from about 750° F. to about 950° F. prior to the solution step.

3. The process of claim 1 in which the sylvinite ore is heated to a temperature within the range from about 750° F. to about 950° F. prior to the solution step and maintained within said temperature range for a period of from 10 minutes to two hours.

4. The process of recovering sylvite from sylvinite ore composed substantially of sylvite, halite and water insoluble slime comprising heating the sylvinite ore to a temperature of from about 500° F. to the fusion temperature of the ore, dissolving sylvite from the ore with hot brine, unsaturated with respect to sylvite, to form a hot aqueous solution of soluble constituents of the ore in which solution is suspended slime and undissolved halite, mechanically separating the suspended slime and undissolved halite from said hot aqueous solution, and then cooling the aqueous solution thereby causing sylvite to crystallize.

5. The process of recovering sylvite from sylvinite ore composed substantially of sylvite, halite and water insoluble slime comprising heating the sylvinite ore to a temperature of from about 500° F. to the fusion temperature of the ore, dissolving sylvite from the ore with hot brine, unsaturated with respect to sylvite, to form a hot aqueous solution of soluble constituents of the ore in which solution is suspended slime and undissolved halite, separating the suspended slime and undissolved halite from said hot aqueous solution by settling and then cooling the aqueous solution thereby causing sylvite to crystallize.

6. The process of recovering sylvite from sylvinite ore composed substantially of sylvite, halite and water insoluble slime comprising heating the sylvinite ore to a temperature of from about 500° F. to the fusion temperature of the ore, dissolving sylvite from the ore with hot brine, unsaturated with respect to sylvite, to form a hot aqueous solution of soluble constituents of the ore in which solution is suspended slime and undissolved halite, separating the suspended slime and undissolved halite from said hot aqueous solution by filtration, and then cooling the aqueous solution thereby causing sylvite to crystallize.

7. The process of recovering sylvite from sylvinite ore composed substantially of sylvite, halite and water insoluble slime comprising heating the sylvinite ore to a temperature of from about 500° F. to the fusion temperature of the ore, dissolving sylvite from the ore with hot brine, unsaturated with respect to sylvite, to form a hot aqueous solution of soluble constituents of the ore in which solution is suspended slime and undissolved halite, adding a flocculant to said hot aqueous solution, mechanically separating the suspended slime and undissolved halite from said hot aqueous solution, and then cooling the aqueous solution thereby causing sylvite to crystallize.

8. The process of recovering sylvite from sylvinite ore composed substantially of sylvite, halite and water insoluble slime comprising heating the sylvinite ore to a temperature of from about 500° F. to the fusion temperature of the ore, dissolving sylvite from the ore with hot brine, unsaturated with respect to sylvite, to form a hot aqueous solution of soluble constituents of the ore in which solution is suspended slime and undissolved halite, adding a flocculant to the hot aqueous suspension, thickening said hot aqueous suspension to form an overflow of clarified solution of the soluble constituents of the said ore, and an underflow comprising a portion of hot aqueous solution in which is suspended substantially all of the slime and undissolved halite, filtering said underflow to recover most of said hot aqueous solution contained therein as a filtrate, and then cooling the overflow and the filtrate, thereby causing sylvite to crystallize.

References Cited in the file of this patent

UNITED STATES PATENTS 2,703,272    Fuchsman _____ Mar. 1, 1955